US008545132B2

(12) United States Patent
Graham et al.

(10) Patent No.: US 8,545,132 B2
(45) Date of Patent: Oct. 1, 2013

(54) METHOD AND APPARATUS FOR INSULATING A COMPONENT OF A LOW-TEMPERATURE OR CRYOGENIC STORAGE TANK

(75) Inventors: Thomas Glen Graham, Plainfield, IL (US); Brian D. Wiese, Naperville, IL (US); David M. O'Meara, Joliet, IL (US)

(73) Assignee: Chicago Bridge & Iron Company, Plainfield, IL (US)

( * ) Notice: Subject to any disclaimer, the term of this patent is extended or adjusted under 35 U.S.C. 154(b) by 0 days.

(21) Appl. No.: 13/547,739

(22) Filed: Jul. 12, 2012

(65) Prior Publication Data

US 2013/0008560 A1 Jan. 10, 2013

Related U.S. Application Data

(62) Division of application No. 12/186,039, filed on Aug. 5, 2008, now Pat. No. 8,240,344.

(51) Int. Cl.
*B65G 53/42* (2006.01)

(52) U.S. Cl.
USPC .............................. 406/152; 141/65; 141/392

(58) Field of Classification Search
USPC ................. 141/4, 7, 8, 382, 65, 98, 323, 392; 136/149; 156/276; 220/592.27; 406/152
See application file for complete search history.

(56) References Cited

U.S. PATENT DOCUMENTS

| | | | | |
|---|---|---|---|---|
| 2,301,617 | A * | 11/1942 | Cox et al. | 406/152 |
| 3,153,344 | A * | 10/1964 | Lawrence et al. | 406/152 |
| 3,416,844 | A * | 12/1968 | Steidley | 406/152 |
| 4,733,799 | A * | 3/1988 | Wiskur | 222/79 |
| 5,595,461 | A * | 1/1997 | Miller | 406/152 |
| 7,775,849 | B2 * | 8/2010 | Wong et al. | 446/153 |
| 2003/0029877 | A1 | 2/2003 | Mathur et al. | |

OTHER PUBLICATIONS

Official Action issued in corresponding Russian Application No. 2011108382 with an English language communication reporting the same; Dated Jul. 27, 2012 (6 pages).
Examiner's Report issued in corresponding Canadian Application No. 2,732,871; Dated Jul. 26, 2012 (3 pages).

* cited by examiner

*Primary Examiner* — Timothy L Maust
*Assistant Examiner* — Timothy P Kelly
(74) *Attorney, Agent, or Firm* — Osha Liang LLP

(57) ABSTRACT

A process for insulating the void in a thermal distance piece in a low-temperature or cryogenic storage tank uses a vacuum source to draw insulation into the TDP. Two remotely spaced openings to the void are provided. A strainer is temporarily mounted in one of the openings. The other opening is connected to a suction wand. The wand has an inner cylinder that extends through an outer cylinder and projects outwardly from a proximal end of the outer cylinder. Distal air vents are provided on the inner cylinder, near a distal cap that connects distal ends of the cylinders. Proximal air vents are provided on a proximal cap that connects a portion of the inner cylinder to a proximal end of the outer cylinder. The distal end of the wand is inserted into a container of insulation.

5 Claims, 4 Drawing Sheets

METHOD AND APPARATUS FOR INSULATING A COMPONENT OF A LOW-TEMPERATURE OR CRYOGENIC STORAGE TANK

CROSS-REFERENCE TO RELATED APPLICATIONS

This application is a divisional application and claims benefit under 35 U.S.C. § 120to U.S. patent application Ser. No. 12/186,039, filed Aug. 5, 2008, which is incorporated by reference in its entirety.

BACKGROUND OF THE INVENTION

The invention relates generally to the construction of low-temperature or cryogenic storage tanks used, for example, to store large quantities (for example, ½ million barrels or more) of volatile materials such as natural gas. In particular, the invention relates to ways to efficiently insulate parts of such tanks.

Conventionally, low-temperature or cryogenic tanks have an outer shell around an inner tank. Process piping extends between the outer shell and the inner tank, and a thermal distance piece (TDP) is used to insulate that process piping. The TDP creates as an enclosed internal space or void that can be insulated using a fiberglass blanket, field-cut fiberglass disks: perlite fill, or other granular insulating material. Conventionally, perlite fill has been pneumatically blown into the void within the TDP through a face plate. This process has been viewed as satisfactory.

The applicants have found a way to fill the void within a TDP more efficiently, with less waste and with less environmental impact.

BRIEF DESCRIPTION

Unlike the previous method of using a blower or jet pump to provide positive pressure to blow the insulation into the void, the new process uses a vacuum source to draw insulation into the TDP.

To use this method, the applicants have developed a new suction wand that can be easily fabricated from PVC pipe. The wand has inner and outer cylinders. The inner cylinder extends through the outer cylinder and projects outwardly from a proximal end of the outer cylinder. A proximal cap connects the proximal end of the outer cylinder to the inner cylinder. A distal cap connects the distal ends of the inner and outer cylinders. Air vents are provided on the proximal cap and on the inner cylinder near the distal cap.

Portions of the TDP can be sealed by wrapping them with low-density polyethylene (LDPE) sheeting or other suitable material prior to drawing a vacuum.

To use the new method, two or more openings to the void are provided. The openings are spaced remotely from each other, and can be provided, for example, by removing a plug from a pipe coupling or threadolet. A strainer is temporarily provided in one of the openings.

The distal end of the suction wand is inserted into a container of insulation or comparable material, such as a bag of perlite insulation. The proximal end of the suction wand is connected to the opening on the TDP that does not have the strainer. A vacuum is then drawn through the opening with the strainer, causing the material to be drawn by the vacuum through the suction wand and into the void.

BRIEF DESCRIPTION OF THE DRAWINGS

The invention may be understood better by referring to the accompanying drawings, in which.

DETAILED DESCRIPTION

Figure 1:
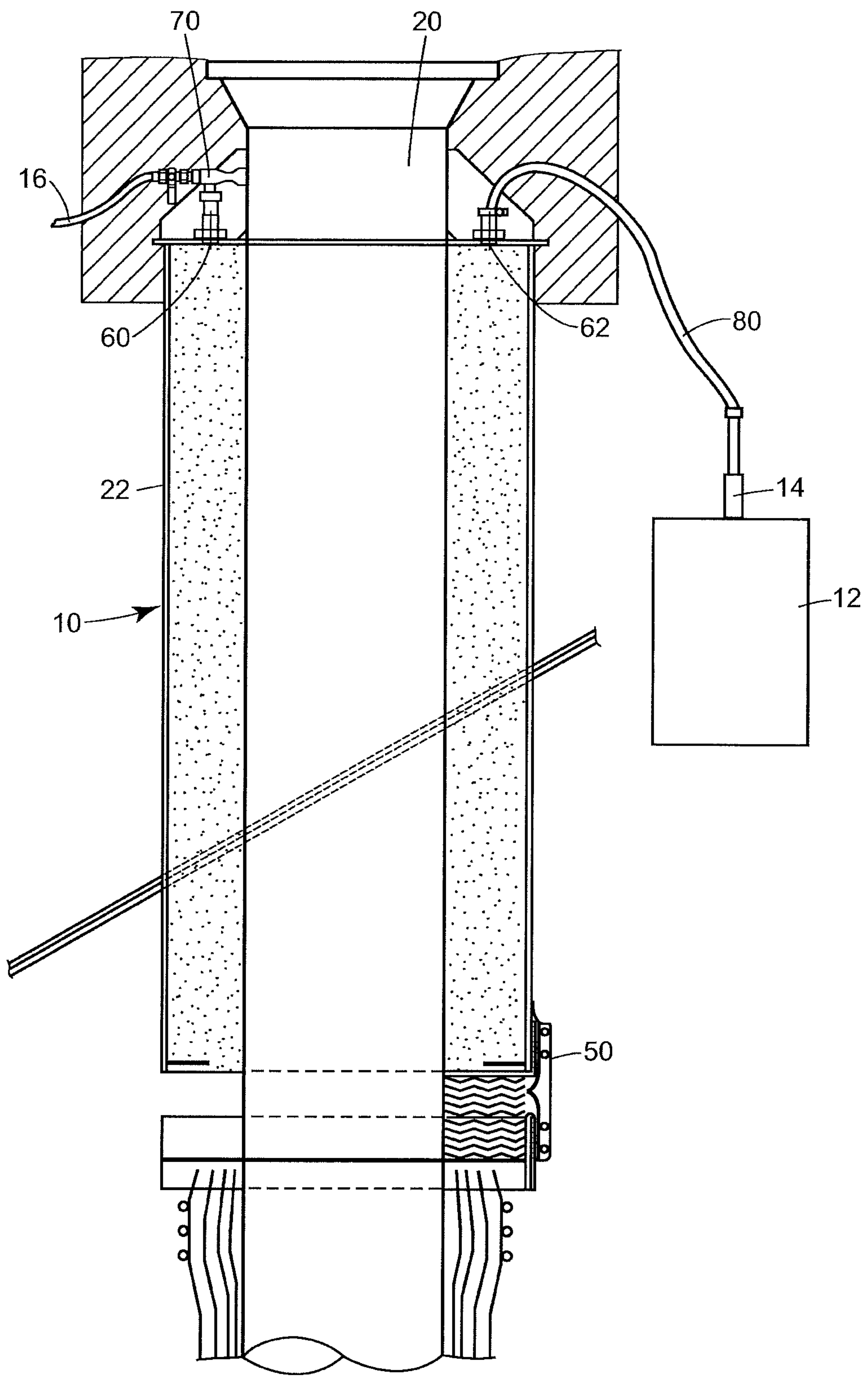
FIG. 1 is a view of the wand being used to deliver insulation to a component of a cryogenic storage tank.

FIG. 1 shows one of many possible variations of use of the invention. The basic elements that are shown here include a conventional thermal distance piece (TDP) 10, a container of insulation 12, a wand 14, and a vacuum source 16. Each of these elements will be discussed in more detail below. In this example, the method is being used in a tank for cryogenic (i.e., −60 to −320° F.) storage of products such as liquefied natural gas (LNG). The invention could also be used for tanks or vessels for low-temperature (i.e. +40 to −60° F.) service, such as for storage or handling of butane or other low-temperature liquids.

The size and arrangement of a TDP 10 may vary. Generally, a TDP has a cylindrical outer wall 22 that surrounds the nozzle 20 that extends between the inner and outer tank shells. The TDP outer wall is typically 8-12 inches wider than the nozzle, which can range from 3-40" in (outside) diameter. Thus, the outer wall can be from 11-52" in diameter or greater. TDP' s of this size are typically from 5'8" to 6' long.

Figure 2:
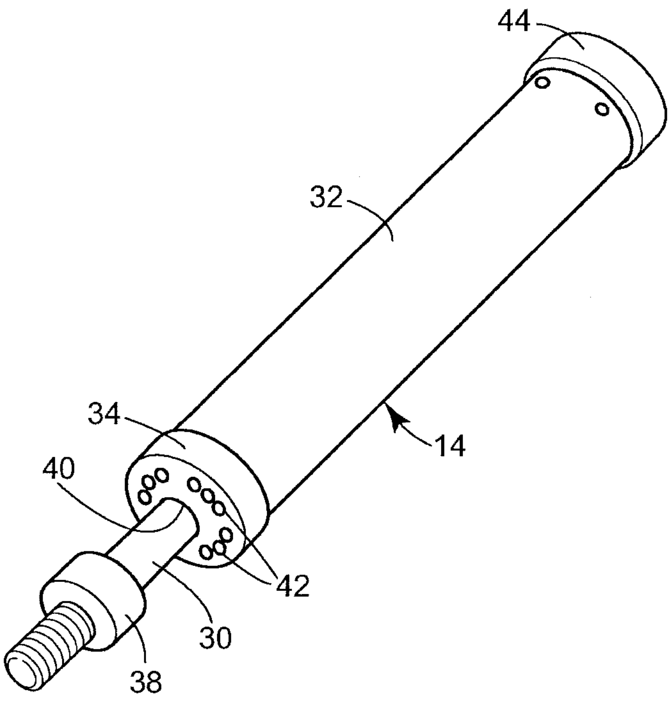
FIG. 2 is a perspective view of a wand used to deliver insulation.
Figure 3:
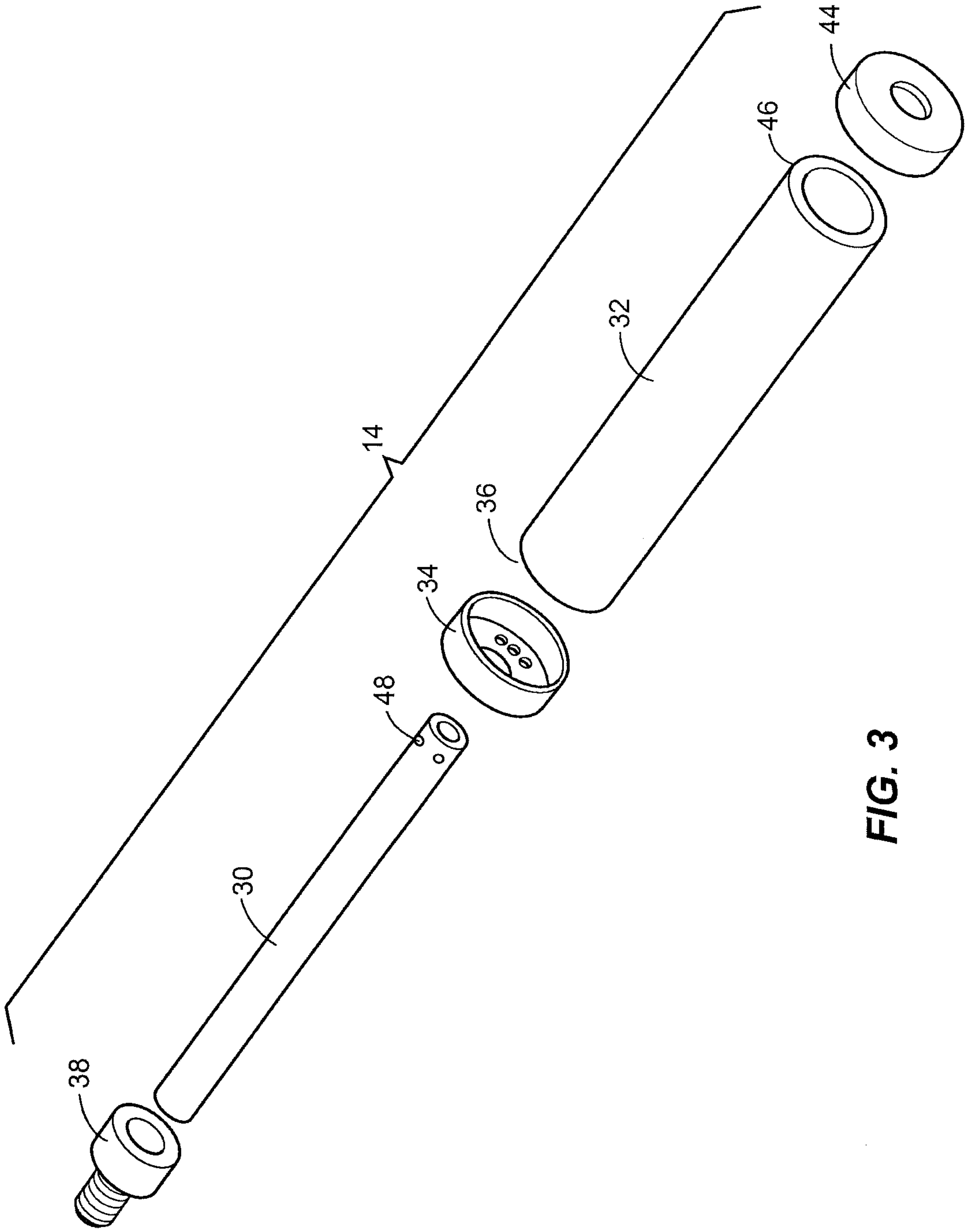
FIG. 3 is an exploded perspective view of the wand.

As seen in FIGS. 2 and 3, the illustrated suction wand 14 is fabricated from conventional PVC pipe, but could also be fabricated from other material. The wand has inner and outer cylinders. In this example, the inner cylinder 30 is made of 1" inside diameter PVC pipe and is approximately 28" long. The outer cylinder 32 is made of 2" inside diameter PVC pipe and is approximately 25" long. The inner cylinder extends through the outer cylinder and projects approximately 2-3" upwardly from a proximal cap 34 on one end 36 of outer cylinder. These dimensions may vary. Here, a 1" MPT×1" PVC socket female adapter 38 is attached to the projecting end of the inner cylinder. Other pipe or tube arrangements could be used.

The proximal cap 34, here made of PVC, connects the proximal end of the outer cylinder 32 to the inner cylinder 30. The inner cylinder 30 extends through a 1 and ¼" diameter central opening 40 in the cap. Proximal air vents 42 are provided on the proximal cap. In this example, the proximal air vents take the form of a series of twelve 5/16" diameter holes drilled around the central opening in the cap. A distal cap 44 connects a portion of the inner cylinder to a distal end 46 of the outer cylinder 32. Distal air vents 48 are provided on the inner cylinder near the distal cap. In this example, the distal air vents take the form of four ⅛" diameter holes drilled approximately ¾" from the distal end of the inner cylinder.

To ensure good delivery of insulation to the void within a "bird-feeder" type retainer TDP such as the one illustrated in the figures, portions of the TDP can be sealed prior to applying the vacuum. This can be done, for example, with plastic sheeting 50 and duct tape.

Figure 4:
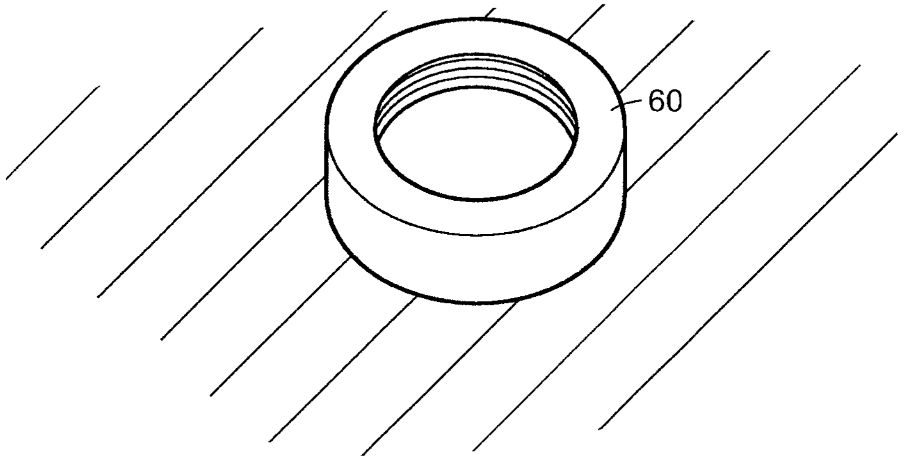
FIG. 4 is an enlarged view of a portion of the top surface of the TDP, showing one of two openings used to access the void within the TDP.

In the illustrated arrangement, two openings 60 and 62 in the TDP 10 (see FIG. 1) are used to draw or move perlite into the void within the TDP. In the example seen in FIG. 4, the openings are remotely-spaced %" or 1" threadolets or pipe couplings. They are generally sealed by conventional pipe plugs (not shown). Generally, the openings should be positioned on opposite sides of the TDP 10.

Figure 5:
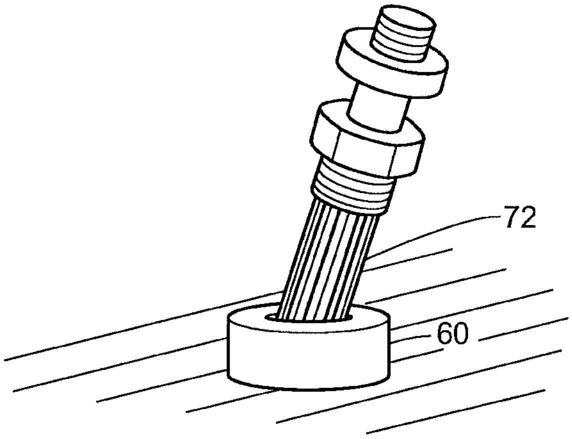
FIG. 5 is a perspective view of a strainer being added to one of the openings.

In the illustrated arrangement, suction is provided through one of the openings 60. Although other arrangements are possible, in this case suction is providing using a PENBERTHY GH1 jet pump 70 or equal, as seen in FIG. 1. The jet pump is connected to a 1" suction strainer 72 (seen in FIG. 5) that is screwed into a pipe coupling in the opening. When connected, the pump preferably draws a vacuum of a minimum of 8-10 inches of mercury in the TDP, as measured at the opposite opening 62.

The vacuum provided by the jet pump 70 draws insulation through the opposite opening 62. To do this, the distal end of the suction wand 14 (the end with the distal cap 44) is here inserted into the container 12 of insulation, as seen in FIG. 1. In this example, the container is a 4 cubic-foot bag of perlite insulation. Other containers and other types of insulation or comparable granular material could also be used. The opposite, proximal end of the suction wand is connected to a 1" i.d. hose 80 using Teflon tape and a hose clamp. (Other arrangements are possible.) The opposite end of the hose is connected to the opening 62 on the TDP 10 and can be further sealed using duct tape.

As the insulation is drawn from the container 12 into the TDP 10, the proximal air vents 42 on the proximal end of the wand 14 should be kept above the level of insulation in the container.

During fill, the hose 80 may clog. If it does, repeatedly "throttling" the jet pump 70 off for several seconds and then back on may enable more insulation to be added.

After the initial fill, the TDP 10 can be vibrated to settle the insulation in the void. The vibration process is well known among those skilled in the field. After vibration, the fill process is repeated. The strainer 72 and the hose 80 are then removed, and the openings 60 and 62 are re-sealed.

The illustrated TDP 10 can be sealed, filled, vibrated, and "topped off" with a final fill in less than one hour. In contrast, the conventional process of blowing insulation into the illustrated TDP would take more than several hours, and would result in more insulation being lost to the environment during the fill process.

This description of various embodiments of the invention has been provided for illustrative purposes. Revisions or modifications may be apparent to those of ordinary skill in the art without departing from the invention. The full scope of the invention is set forth in the following claims.

What is claimed is:

1. A wand that is used for placing insulation and has:
- an outer cylinder that is between 1" and 3" in diameter and is at least 10" long;
- an inner cylinder that extends through the outer cylinder;
- a proximal cap that connects a proximal end of the outer cylinder to the inner cylinder;
- a distal cap that connects a portion of the inner cylinder to a distal end of the outer cylinder;
- an air vent on the inner cylinder, near the distal cap; and
- an air vent on or near the proximal cap that leads to a space between the inner and outer cylinders.

2. The wand as recited in claim 1, in which the inner and outer cylinders are made of PVC pipe.

3. The wand as recited in claim 1, in which the air vent on or near the proximal cap comprises at least 2 holes drilled around a central opening of the proximal cap.

4. The wand as recited in claim 1, in which the air vent on the inner cylinder comprises at least 2 holes drilled about ¾" from a distal end of the inner cylinder.

5. The wand as recited in claim 1, in which the inner cylinder projects approximately 2-3" upwardly from the proximal cap on the proximal end of the outer cylinder.

* * * * *